United States Patent
Yi et al.

(10) Patent No.: US 9,038,166 B2
(45) Date of Patent: May 19, 2015

(54) METHOD AND APPARATUS FOR AUTHENTICATING PASSWORD OF USER TERMINAL

(75) Inventors: Jeong Hyun Yi, Seongnam-si (KR); Gun Il Ma, Seoul (KR); Hyun Yi Yi, Incheon (KR); Si Wan Kim, Seoul (KR)

(73) Assignee: SOONGSIL UNIVERSITY RESEARCH CONSORTIUM TECHNO-PARK, Seoul (KR)

( * ) Notice: Subject to any disclaimer, the term of this patent is extended or adjusted under 35 U.S.C. 154(b) by 76 days.

(21) Appl. No.: 13/879,871

(22) PCT Filed: Dec. 23, 2011

(86) PCT No.: PCT/KR2011/010048
§ 371 (c)(1),
(2), (4) Date: Apr. 17, 2013

(87) PCT Pub. No.: WO2013/069844
PCT Pub. Date: May 16, 2013

(65) Prior Publication Data
US 2014/0201831 A1    Jul. 17, 2014

(30) Foreign Application Priority Data

Nov. 10, 2011 (KR) ........................ 10-2011-0116955

(51) Int. Cl.
*G06F 21/31* (2013.01)
*G06F 21/36* (2013.01)
(Continued)

(52) U.S. Cl.
CPC ................ *G06F 21/31* (2013.01); *G06F 21/36* (2013.01); *H04L 9/3226* (2013.01); *H04L 63/08* (2013.01); *G06F 21/556* (2013.01); *G06F 2221/2115* (2013.01); *G06F 2221/2117* (2013.01)

(58) Field of Classification Search
USPC .......................................................... 726/19
See application file for complete search history.

(56) References Cited

U.S. PATENT DOCUMENTS 8,214,892 B2 * 7/2012 Cohen et al. ..................... 726/19
2004/0010721 A1 * 1/2004 Kirovski et al. .............. 713/202
(Continued)

FOREIGN PATENT DOCUMENTS

KR    10-2008-0011363 A    2/2008
WO    WO 2008105602 A1 * 9/2008

OTHER PUBLICATIONS

Monrose et al, "Password hardening based on keystroke dynamics", 2001, Springer-Verlag, 75.*

*Primary Examiner* — Yonas Bayou
(74) *Attorney, Agent, or Firm* — Sherr & Jiang, PLLC

(57) ABSTRACT

Provided are method and apparatus for authenticating a password of a user terminal. The method includes: pre-setting, by a user, a password and an identification image for identifying the password; moving a keypad window or an image window realized on a screen of the user terminal according to an action of the user; determining, when a plurality of images included in the image window and a plurality of keys included in the keypad window sequentially overlap with each other, whether a plurality of keys and the identification image corresponding to the password sequentially overlap; and authenticating the password when the plurality of keys and the identification image corresponding to the password sequentially overlap. Accordingly, password information may be protected from a third person observation as the user inputs a pre-set password in an indirect method without having to directly input the pre-set password through an authentication interface.

15 Claims, 6 Drawing Sheets

(51) Int. Cl.
*H04L 9/32* (2006.01)
*H04L 29/06* (2006.01)
*G06F 21/55* (2013.01)

(56) References Cited

U.S. PATENT DOCUMENTS

| | | | |
|---|---|---|---|
| 2005/0144484 A1* | 6/2005 | Wakayama | 713/202 |
| 2007/0061589 A1* | 3/2007 | Ulmer et al. | 713/185 |
| 2007/0209014 A1* | 9/2007 | Youmtoub | 715/771 |
| 2008/0216163 A1* | 9/2008 | Pratte et al. | 726/7 |
| 2009/0037986 A1* | 2/2009 | Baker | 726/5 |
| 2009/0094687 A1* | 4/2009 | Jastrebski et al. | 726/6 |
| 2009/0106827 A1* | 4/2009 | Cerruti et al. | 726/7 |
| 2009/0113294 A1* | 4/2009 | Sanghavi et al. | 715/269 |
| 2009/0232351 A1* | 9/2009 | Kagitani et al. | 382/100 |
| 2009/0307765 A1* | 12/2009 | Mardikar et al. | 726/7 |
| 2011/0029902 A1* | 2/2011 | Bailey | 715/764 |

* cited by examiner

METHOD AND APPARATUS FOR AUTHENTICATING PASSWORD OF USER TERMINAL

CROSS REFERENCE TO PRIOR APPLICATION

This application is a National Stage Patent Application of PCT International Patent Application No. PCT/KR2011/010048 (filed on Dec. 23, 2011) under 35 U.S.C. §371, which claims priority to Korean Patent Application No. 10-2011-0116955 (filed on Nov. 10, 2011) which are all hereby incorporated by reference in their entirety.

CROSS-REFERENCE TO RELATED PATENT APPLICATION

This application claims the benefit of Korean Patent Application No. 10-2011-0116955, filed on Nov. 10, 2011, in the Korean Intellectual Property Office, the disclosure of which is incorporated herein in its entirety by reference.

BACKGROUND OF THE INVENTION

1. Field of the Invention

The present invention relates to a method and apparatus for authenticating a password of a user terminal, and more particularly, to a password authentication technique for preventing a password from being exposed via shoulder surfing.

2. Description of the Related Art

A system including user information should only allow an access of a permitted user, and a technology for determining whether an access is attempted by a permitted lawful user is called a user authentication technique. Such a user authentication technique is widely used for security, in login of an Internet website, Internet banking, and a user terminal. Also, according to growing supplies of user terminals, such as laptops, smart phones, and tablet PCs, authentication processes using such user terminals are frequently performed in public places.

However, a conventional user authentication technique using a personal identification number (PIN) input may be weak against a shoulder surfing or recording attack by a third person and a spyware/keylogger attack because a password of a user is exposed as it is during an input process. Accordingly, a method of preventing a keylogger attack by randomly arranging numbers for a password has been suggested, but the password may still be exposed via a shoulder surfing or a recording attack.

Accordingly, the inventors of the present invention studied a user authentication interface technique wherein a password is not exposed to a third person just by observing information input through a user authentication interface of a user terminal. A background technique of the present invention is disclosed in KR 10-2008-0011363 (published on 4 Feburary 2008).

SUMMARY OF THE INVENTION

The present invention provides a password authentication technique wherein password information is protected from a third person observation as a user inputs a password in an indirect method without having to directly input the password through an interface.

According to an aspect of the present invention, there is provided a method of authenticating a password of a user terminal, the method including: pre-setting, by a user, a password and an identification image for identifying the password; moving a keypad window or an image window realized on a screen of the user terminal according to an action of the user; determining, when a plurality of images included in the image window and a plurality of keys included in the keypad window sequentially overlap with each other, whether a plurality of keys and the identification image corresponding to the password sequentially overlap; and authenticating the password when the plurality of keys and the identification image corresponding to the password sequentially overlap.

The pre-setting may include: selecting, by the user, the password from among the plurality of keys included in the keypad window; and selecting, by the user, the identification image for identifying the password, and one or more dummy images from among the plurality of images included in the image window.

The identification image and the plurality of images may be represented by any one of a symbol, a character, a figure, a color, or a combination thereof.

The selecting of the identification image and one or more dummy image may include selecting a number of images included in the image window, an arrangement of images included in the image window, or a location of the identification image.

The keypad window and the image window may be realized on a touch screen.

The determining may include when a pre-set location is touched on the touch screen while the image window is overlapped on the keypad window, determining that a key overlapped by the identification image is selected as the password.

The keypad window may be arranged in an x×y matrix and the image window may be arranged in a (x−n)×(y−m) matrix, wherein 0≤n<x and 0≤m<y.

According to another aspect of the present invention, there is provided an apparatus of authenticating a password of a user terminal, the apparatus including: a setter for pre-setting, by a user, a password and an identification image for identifying the password; a window mover for moving a keypad window or an image window realized on a screen of the user terminal according to an action of the user; a password determiner for determining, when a plurality of images included in the image window and a plurality of keys included in the keypad window sequentially overlap with each other, whether a plurality of keys and the identification image corresponding to the password sequentially overlap; and a password authenticator for authenticating the password when the plurality of keys and the identification image corresponding to the password sequentially overlap.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described more fully with reference to the accompanying drawings, in which exemplary embodiments of the invention are shown. Terms used herein are selected considering functions in embodiments of the present invention, and thus meanings of the terms may differ according to users, intentions of operators, or precedents. Thus, the meanings of the terms used in the following embodiments shall follow the definitions if defined herein, otherwise shall have the same meaning as is commonly understood by one of skill in the art to which this invention belongs.

Figure 1:
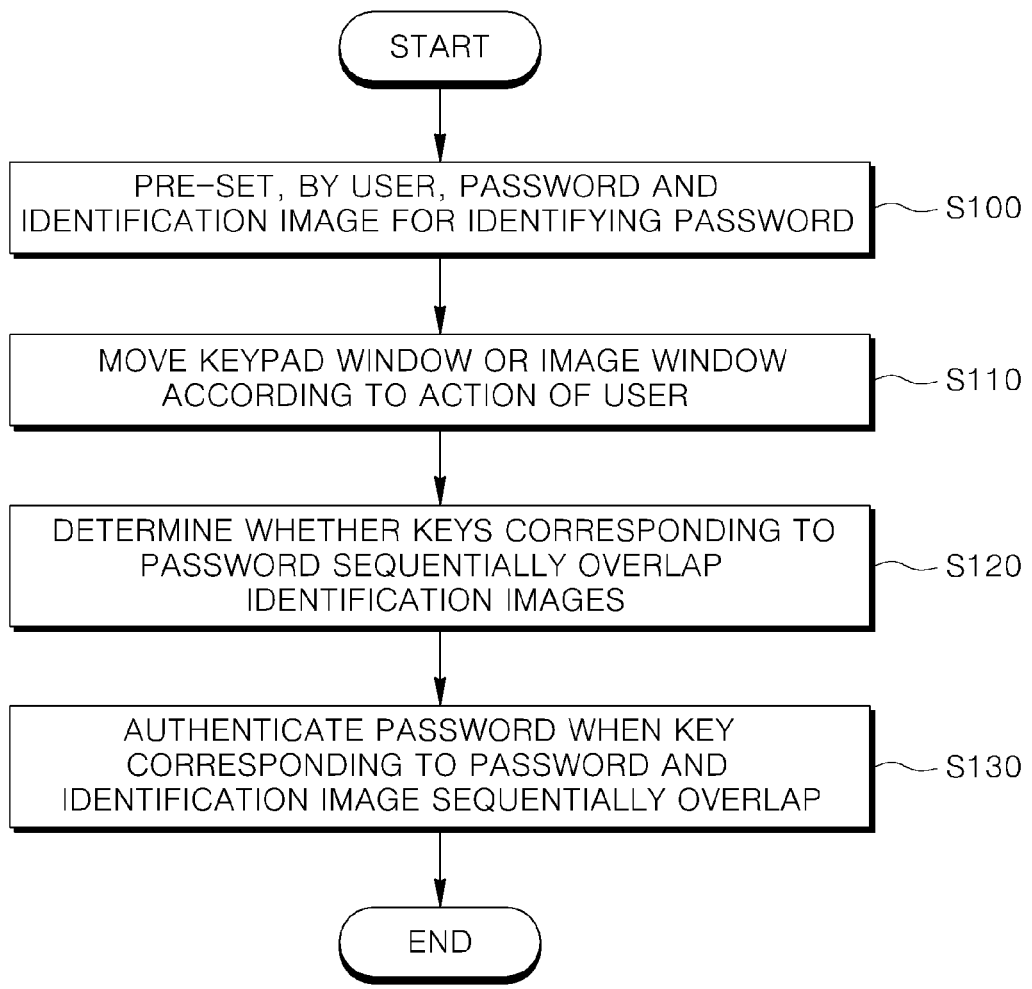
FIG. 1 is a flowchart illustrating a method of authenticating a password, according to an embodiment of the present invention.
Figure 2:
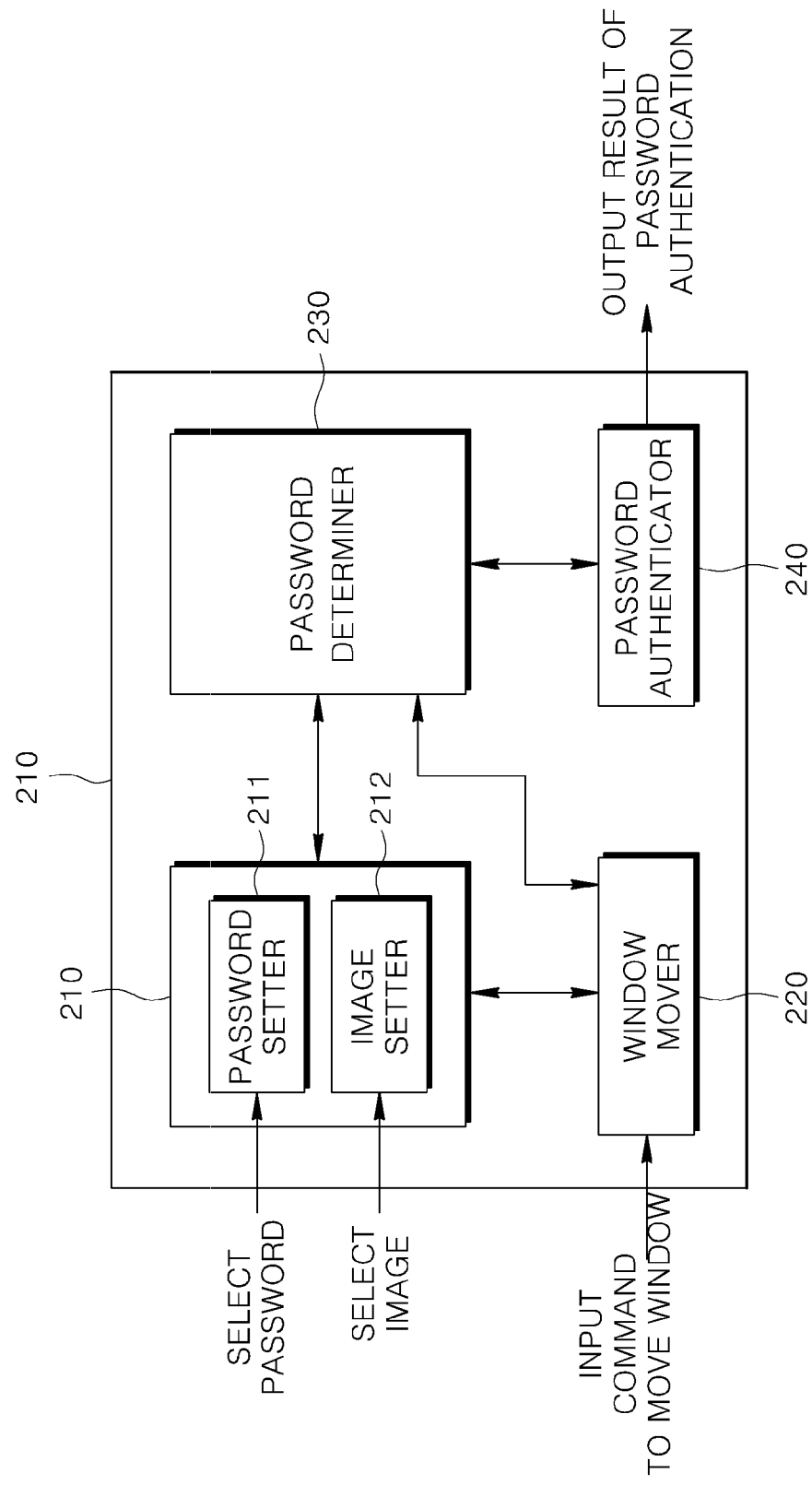
FIG. 2 is a block diagram of an apparatus for authenticating a password by using the method of FIG. 1.

FIG. 1 is a flowchart illustrating a method of authenticating a password, according to an embodiment of the present invention, and FIG. 2 is a block diagram of an apparatus 200 for authenticating a password by using the method of claim 1.

Referring to FIGS. 1 and 2, the apparatus 200 includes a setter 210, a window mover 220, a password determiner 230, and a password authenticator 240. The setter 210 in detail includes a password setter 211 and an image setter 212. In operation S100, the password setter 211 sets, by a user, a password through an interface from among a plurality of keys included in a keypad window realized on a screen of a user terminal, and the image setter 212 sets, by the user, an identification image for identifying the password, from among a plurality of images included in an image window realized on the screen of the user terminal. Examples of the user terminal include fixed terminals, such as a desktop computer, an automated teller machine (ATM), a kiosk, and an equivalent terminal, and mobile terminals, such as a laptop, a tablet personal computer (PC), and a mobile phone. In the user terminal, an input interface and a display may be separated from each other, or may be combined with each other if a touch screen is used.

Meanwhile, the keypad window includes the plurality of keys, wherein each key may be set in any one form from among a symbol, a character, a figure, a color, a hologram, an action, and a combination thereof. The password setter 211 receives a predetermined number of keys in the keypad window as a password, from the user. Setting of the password by the user will now be described with reference to FIG. 3.

Figure 3:
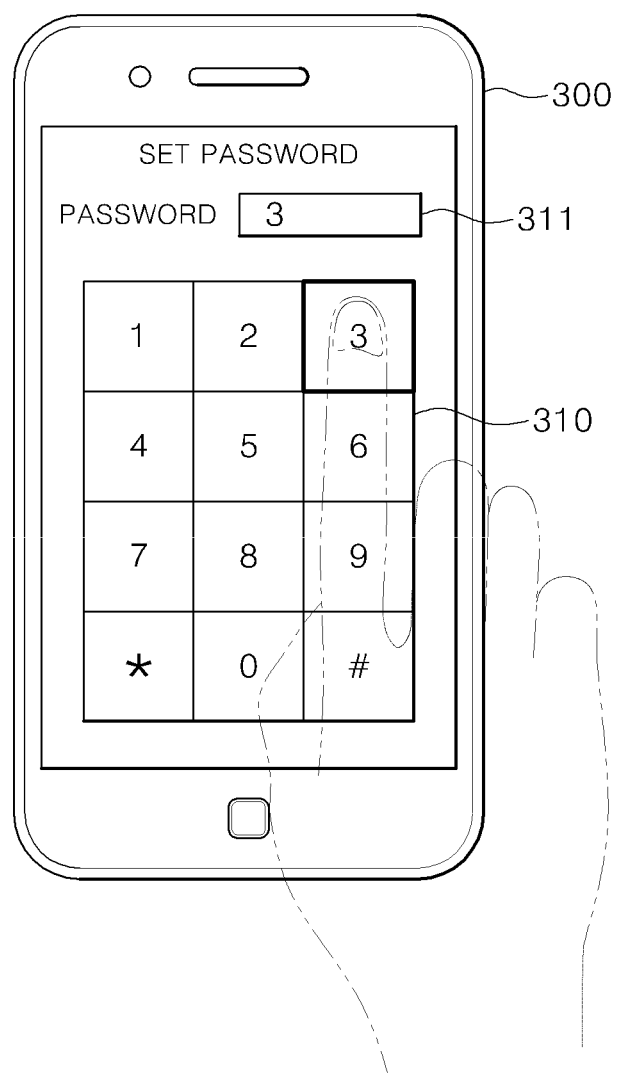
FIG. 3 is a diagram for describing selecting of a password of the method of FIG. 1.

FIG. 3 is a diagram for describing the selecting of the password of the method of FIG. 1.

Referring to FIG. 3, the user may input the password through an interface of a user terminal 300. Here, the interface may be a keyboard, a joystick, or a touch screen. The user may arbitrarily set the password from among keys represented in any one form from among a symbol, a character, a figure, a color, a hologram, an action, and a combination thereof, wherein the keys are included in a keypad window 310, and may check the password through a password confirmation window 311. For example, when the password is in numerals, any one numeral from among 0 through 9 may be selected for each digit. Also, when the user tries password authentication afterwards, the keypad window 310 may randomly change locations of the keys.

Referring back to FIGS. 1 and 2, the image setter 212 receives an identification image for identifying the password and at least one dummy image from the user, wherein the identification image and the dummy image are included in the image window overlapping with the keypad window. The image setter 212 receives an image select signal from the user through the interface, like the password setter 211. The image window is a window displayed by overlapping the keypad window. The image window includes the images shown in any one of a symbol, a character, a figure, a color, a hologram, an action, and a combination thereof, like the keys in the keypad window. However, at this time, the keys and the images may have different forms to be distinguished from each other. For example, when the keys are in numerals, the images may be faces having different expressions.

Also, the image setter 212 may select, by the user, a number of the images, an arrangement of the images, or locations of the images to be included in the image window. The image window has a group of a plurality of images, and in this case, includes an identification image overlapping a location corresponding to the password and a plurality of dummy images for preventing the password from being exposed to a third person. The number or arrangement of the images included in the image window may differ according to setting of the user.

When the keypad window is arranged in a x×y matrix, the image setter 212 may receive, from the user, image window select information such that the image window is arranged in a (x−n)×(y−m) matrix, wherein 0≤n<x and 0≤m<y. In other words, the image window may have a size movable while overlapping the keypad window, and may be arranged in a matrix having the same size as the keypad window. The selecting of an image included in the image window will now be described with reference to FIGS. 4A and 4B.

Figure 4A:
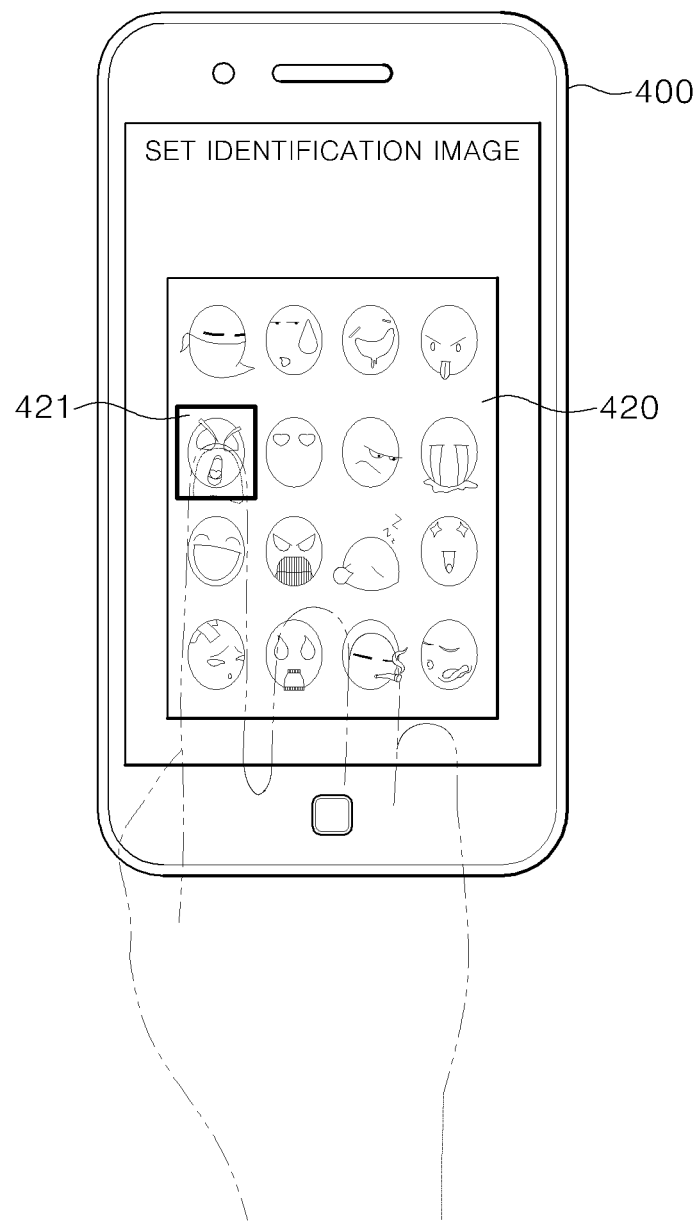
FIG. 4A is a diagram for describing selecting of an image of the method of FIG. 1.
Figure 4B:
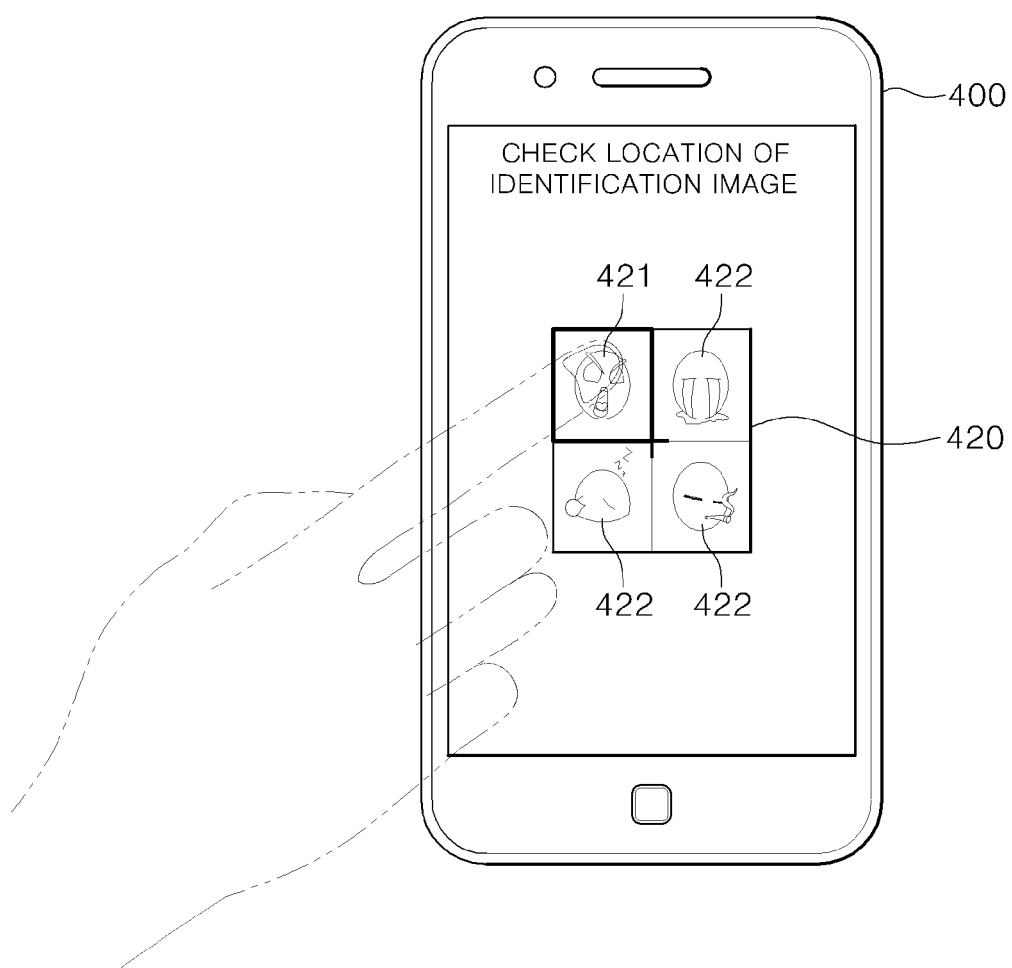
FIG. 4B is a diagram for describing setting of an image window of the method of FIG. 1.

FIG. 4A is a diagram for describing the selecting of an image of the method of FIG. 1, and FIG. 4B is a diagram for describing the setting of the image window of the method of FIG. 1.

Referring to FIG. 4A, an image window 420 may include a group of a plurality of images. The user selects an identification image 421 from among the images provided via a display of a user terminal 400. As described above, the identification image 421 is an image overlapping according to the password included in the keypad window. Also, the user may set a size of the image window 420. For example, referring to FIG. 4B, when the image window 420 includes four images, the user may select one identification image 421 and three dummy images 422. Alternatively, when the user sets one identification image 421, the image setter 212 may arbitrarily select the other three dummy images 422 to form the image window 420.

Referring to FIG. 4B, when the image setter 212 forms the image window 420 by receiving the image select signal including the identification image 421 selected by the user, the user checks a location of the identification image 421. Upon checking the location of the identification image 421 in the image window 420, the user may later manipulate the identification image 421 to overlap a key corresponding to the password during password authentication. The location of the identification image 421 may be randomly located by the image setter 212.

Alternatively, the user may set the location of the identification image 421. For example, if the input interface is a touch screen, the user may drag the identification image 421 to a desired location. Also, the image setter 212 may receive a setting complete signal about the image window 420 desired by the user through the interface. Upon receiving the setting complete signal, the identification image 421 may generate the image window 420 based on information selected by the user.

Referring back to FIGS. 1 and 2, the window mover 220 moves the keypad window or the image window overlapping each other when a command to move the keypad window or the image window is received from the user through the interface, in operation S110. The window mover 220 may freely move the keypad window or the image window in up-and-down (↕), right-and-left (↔), and diagonal (↖, ↗, ↘, and ↙) directions. Here, when one of the keypad and image windows is movable, the other one may be fixed. For example, if the interface is a touch screen and the user moves the image window by dragging the image window with a finger, the keypad window may be fixed so as to increase convenience of the user.

Also, when the keypad window and the image window are arranged in a matrix, the window mover 220 may adjust a location of one of the keypad and image windows such that a small matrix in the matrix of the keypad window and a small matrix in the matrix of the image window match each other. For example, when the user moves the keypad or image window through a touch screen, locations of nearest small matrixes may be automatically adjusted to be matched even when the location of the image window according to an input of the user does not accurately match the location of the keypad window.

Then, when the plurality of images of the image window and the plurality of keys of the keypad window sequentially overlap each other, the password determiner 230 determines whether the keys corresponding to the password sequentially overlap the identification images, in operation S120. As the window mover 220 moves the keypad or image window according to the command from the user, the password determiner 230 may receive information about a coordinate of the identification image in the image window, information about a key overlapped by the identification image, and information about time staying on the coordinate. For example, if a finger of the user or the like stayed on 3 for 0.5 seconds, 2 for 0.1 second, 5 for 0.6 seconds, 6 for 0.2 seconds, 7 for 0.8 seconds, and 4 for 1.1 seconds from among the keys of the keypad window in which the keys are numerals, and a pre-set input determination time is 0.5 seconds, the password determiner 230 determines 3, 5, 7, and 4 as a password select signal input by the user.

Also, upon receiving a password determination signal input from the user through the interface, the password determiner 230 determines a password of the keypad window corresponding to a location coordinate of an identification image of an image window as the password select signal. For example, if the interface is a touch screen, the password select signal may be generated when the user touches a pre-set location on the touch screen. In other words, the password select signal may be generated when the user touches a center portion of the image window after overlapping the identification image on a certain key. Alternatively, if the interface is a physical key button, the password select signal may be generated by pressing a corresponding key button. The password select signal may be generated individually according to a number of passwords. Determining of a password according to the password select signal will now be described in detail.

Figure 5:
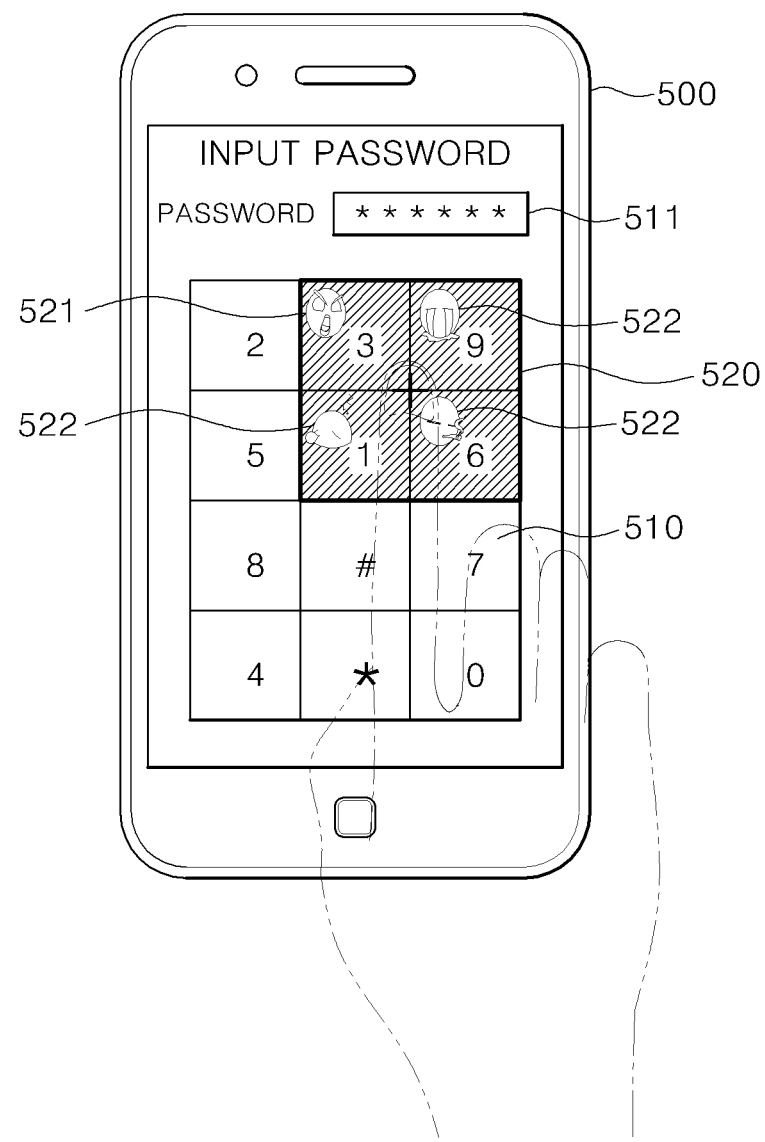
FIG. 5 is a diagram for describing determining of an input password of the method of FIG. 1.

FIG. 5 is a diagram for describing determining of an input password of the method of FIG. 1.

Referring to FIG. 5, a keypad window 510 and an image window 520 overlap each other on a display of a user terminal 500 for user authentication. Here, if in input interface is a touch screen, the user may move any one of the keypad window 510 and the image window 520 via touch-and-drag. When an identification image 521 in the image window 520 overlaps a desired password on the keypad window 510, the user may generate a password select signal by continuously touching a center portion of the image window 520 or touching the center portion for a predetermined period of time. In FIG. 5, the password determiner 230 determines "3" as an input password according to the password select signal. The input password is shown as "k" on a password confirmation window 511, and thus the input password is not exposed to a third person and the user may check whether the input password is selected. Also, since the third person is unable to classify the identification image 521 from dummy images 522, a risk of the password being exposed may be remarkably reduced.

The determining of the input password may be repeatedly performed according to a number of passwords, and an arrangement of the keypad window 510 may change whenever each digit of the password is input. Also, if the image window 520 is overlapped on the keypad window 510, the image window 520 may be semitransparent since the image window 520 may cover the password in the keypad window 510. Also, if the input interface is a mouse of a joystick, the keypad window 510 or the image window 520 may move by using the mouse or the joystick and the password select signal may be generated by clicking a button of the mouse or the joystick.

Referring back to FIGS. 1 and 2, the password authenticator 240 authenticates the password when the password select signal of the user is received from the password determiner 230 and the key corresponding to the password and the identification image sequentially overlap, in operation S130. Also, the password authenticator 240 outputs the result of password authentication may using a display or speaker of the user terminal. For example, when the password pre-set by the user and the password select signal input from the password determiner 230 do not match each other, a password authentication failure message may be displayed on the display or an authentication failure alarm may be generated at the speaker. Accordingly, the user may check whether the password authentication is succeeded.

As described above, according to one or more embodiments of the present invention, password information may be protected from a third person observation as a user inputs a pre-set password in an indirect method without having to directly input the pre-set password through an authentication interface.

The invention can also be embodied as computer readable codes on a computer readable recording medium. The computer readable recording medium is any data storage device that can store data which can be thereafter read by a computer system.

Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:
1. A method of authenticating a password of a user terminal, the method comprising:
  receiving a password via a keypad window of the user terminal;

receiving an identification image and at least one dummy image among a plurality of images and an arrangement of the images via an image window, the identification image to be overlapped at a location corresponding to the password to identify the password;

moving the keypad window or the image window in directions in response to detection of a dragging action of the user via an interface, the image window overlapping the keypad window each other; and authenticating the user by determining whether each key of the keypad window being sequentially overlapped with each location of the identification image of the image window, the location of the identification image corresponding to each digit of the password, wherein the at least one dummy image being provided along with the identification image to prevent from displaying each key and being exposed.

2. The method of claim 1, further comprising:

selecting, by the user, the password from among the plurality of keys of the keypad window; and selecting, by the user, the identification image for identifying the password, and the at least one dummy images from among the plurality of images of the image window.

3. The method of claim 1, wherein the identification image and the plurality of images comprise one of a symbol, a character, a figure, a color, or a combination thereof.

4. The method of claim 2, wherein the selecting of the identification image and at least one dummy image comprises selecting a number of images of the image window, the arrangement of images of the image window, or a location of the identification image.

5. The method of claim 1, wherein the keypad window and the image window are displayed on a touch screen.

6. The method of claim 5, wherein the determining comprises:

in response to detection of a pre-set location while the image window is overlapped on the keypad window, determining whether a key overlapped by the identification image is selected as the password.

7. The method of claim 1, wherein the keypad window is arranged in an x×y matrix and the image window is arranged in a (x−n)×(y−m) matrix, wherein 0≤n<x and 0≤m<y.

8. An apparatus for authenticating a password of a user terminal, the apparatus comprising:

a setter configured to receive a password via a keypad window, and to receive an identification image and at least one dummy image among a plurality of images via an image window, the identification image to be overlapped at a location corresponding to the password to identify the password;

a window mover configured to move the keypad window or the image window in directions in response to detection of a dragging action of the user via an interface, the image window overlapping the keypad window each other;

a password determiner configured to authenticate a user to determine whether each key of the keypad window being sequentially overlapped with each location of the identification image of the image window, the location of the identification image corresponding to each digit of the password, wherein the at least one dummy image being provided along with the identification image to prevent the password being exposed.

9. The apparatus of claim 8, wherein the setter comprises:

a password setter configured to receive the password from among a plurality of keys via the keypad window; and an image setter configured to receive the identification image to identify the password, and a plurality of dummy images from among the plurality of images via the image window.

10. The apparatus of claim 8, wherein the identification image and the plurality of images comprise one of a symbol, a character, a figure, a color, or a combination thereof.

11. The apparatus of claim 9, wherein the image setter configured to receive a number of images selected via the image window, an arrangement of images of the image window, or a location of the identification image.

12. The apparatus of claim 8, wherein the keypad window and the image window are displayed on a touch screen.

13. The apparatus of claim 12, wherein the determiner is configured to determine, in response to detection of a pre-set location while the image window is overlapped on the keypad window, whether a key overlapped by the identification image is selected as the password.

14. The apparatus of claim 8, wherein the keypad window is arranged in an x×y matrix and the image window is arranged in a (x−n)×(y−m) matrix, wherein 0≤n<x and 0≤m<y.

15. A non-transitory recording medium comprising a computer executable program, which when executed by a processor, instructs the processor to perform the following steps:

receiving a password via a keypad window of the user terminal;

receiving an identification image and at least one dummy image among a plurality of images and an arrangement of the images via an image window, the identification image to be overlapped at a location corresponding to the password to identify the password;

moving the keypad window or the image window in directions in response to detection of a dragging action of the user via an interface, the image window overlapping the keypad window each other; and authenticating the user by determining whether each key of the keypad window being sequentially overlapped with each location of the identification image of the image window the location of the identification image corresponding to each digit of the password, wherein the at least one dummy image being provided along with the identification image to prevent from displaying each key and being exposed.

* * * * *